US006449864B1

(12) United States Patent

Newman

(10) Patent No.: US 6,449,864 B1

(45) Date of Patent: Sep. 17, 2002

(54) METHOD AND APPARATUS FOR ROTARY CUTTER BLADE ADJUSTMENT

(76) Inventor: Thomas H. Newman, 4197 Miladies La., Doylestown, PA (US) 18901

( * ) Notice: Subject to any disclaimer, the term of this patent is extended or adjusted under 35 U.S.C. 154(b) by 33 days.

(21) Appl. No.: 09/624,981

(22) Filed: Jul. 25, 2000

(51) Int. Cl.[7] .............................. B23B 1/00; B27C 5/00

(52) U.S. Cl. ............................ 33/641; 144/225; 33/628

(58) Field of Search .......................... 33/633, 641, 832, 33/613, 628, 645, 562; 144/172, 174, 176, 162.1, 225

(56) References Cited

U.S. PATENT DOCUMENTS

| | | | | | |
|---|---|---|---|---|---|
| 875,479 | A | | 12/1907 | West | |
| 1,641,114 | A | | 8/1927 | Carlson | |
| 2,140,760 | A | * | 12/1938 | Ostberg | 33/641 |
| 2,197,192 | A | * | 4/1940 | Norman | 33/641 |
| 3,596,340 | A | * | 8/1971 | Costa | 29/208 R |
| 3,600,816 | A | | 8/1971 | Watanabe | 33/185 |
| 3,667,121 | A | * | 6/1972 | Dorion, Jr. et al. | 30/60 |
| 3,732,611 | A | * | 5/1973 | Watabane | 29/467 |
| 3,772,779 | A | * | 11/1973 | Douglass et al. | 30/45 |
| 3,955,277 | A | * | 5/1976 | Pomfret | 30/47 |
| 4,170,903 | A | * | 10/1979 | Wanke | 73/480 |
| 4,218,024 | A | * | 8/1980 | Pallmann | 241/259.2 |
| 4,345,374 | A | * | 8/1982 | Jacobson | 30/47 |
| 4,662,075 | A | * | 5/1987 | Mastel et al. | 33/628 |
| 4,700,481 | A | * | 10/1987 | Barrett | 30/475 |
| 5,033,201 | A | * | 7/1991 | Hinkle et al. | 33/641 |
| 5,035,670 | A | * | 7/1991 | Pershinske | 452/5 |
| 5,080,153 | A | * | 1/1992 | Waterman | 144/176 |

FOREIGN PATENT DOCUMENTS

| | | | | |
|---|---|---|---|---|
| DE | 0145322 | * | 12/1980 | 33/628 |
| JP | 01299522 A | * | 12/1989 | A47J/43/04 |

* cited by examiner

*Primary Examiner*—Diego Gutierrez
*Assistant Examiner*—Gail Verbitsky

(57) ABSTRACT

A longitudinal gage fixture extends the entire length of the cutting blade and provides positively locked, parallel surfaces that uniformly and reliably set the proper height of the gage blade along its length while in a blade holder, In use, the device requires no frictional movement of the gage along the length of the blade, and adjustment of the blade may be achieved in an accurate, single-step process. The entire blade and holder assembly is positioned within the gage fixture and adjusting screwy at the base of the holder are accessed through apertures in a base plate of the gage fixture so that all necessary adjustments of the blade may be made with the holder insitu without any movement of the holder. Only movement of the blade within the holder is required during adjustment. Once properly adjusted, the tightening down of the blade may also be accomplished with the blade and holder still within the gage fixture.

3 Claims, 6 Drawing Sheets

METHOD AND APPARATUS FOR ROTARY CUTTER BLADE ADJUSTMENT

FIELD OF THE INVENTION

The present invention relates to the blades of rotary cutters. In particular, to blades which are required to be accurately located in a holder on a rotary drum.

BACKGROUND OF THE INVENTION AND DESCRIPTION OF THE PRIOR ART

Rotary cutters include one or more cutting blades which are removable from the body of the rotary cutter for replacement or adjustment. Blades need to be replaced when they become too dull or damaged. The blades may be released from the body of the rotary cutter by removing a blade holder assembly which fits in a pocket along the outer circumference of the cutter drum. The blade is then removed from the holder, sharpened or replaced, then reinstalled in the holder and the holder then reinstalled in the cutter drum.

Alignment problems often occur and the position of the blade with respect to the cutter drum is extremely critical to accurate cutting. The edge of the cutting blade needs to be exposed a very precise distance from the outside surface of the cutting drum. If the blade projects too far, the work is cut too deeply or blade damage may occur from excessive pressure. Conversely, if the blade does not project far enough, the material will not be sufficiently cut. In addition to the work being improperly or inaccurately cut, blade wear may become excessive. Not only does the blade need to project the correct amount, but its orientation needs to be set so that the cutting edge is precisely parallel to the axis of the rotating drum to ensure an even cut along its entire length. Thus, both of the demands of blade height and alignment are critical to the proper and efficient operation of a rotary cutter.

Prior art systems to set the proper height and alignment within the cutting blade holder comprise, for example, a simple hand-held, C-shaped gage as shown in FIG. 2. When using the gage, the blade is first loosened in the holder, and then the blade is advanced, holding the C-shaped gage between the base of the holder and the cutting edge. In order to assure that the cutting edge is parallel to the holder and therefore parallel to the cutting axis of the rotary drum, the gage is dragged across the length of the cutting edge to determine that the edge of the blade extends the proper height at all points. Cutting blades are extremely sharp and very sensitive, therefore the process of pulling the hand gage across the edge of the blade can damage or dull the blade. Furthermore, this process is extremely time-consuming since the cutting blade holder includes a multiplicity of adjusting screws and often setting the height of the blade at one point can change the height at another. Thus, the process is inefficient and time-consuming.

Another method for adjusting a cutting blade in a holder is disclosed in U.S. Pat. No. 3,600,816 issued to Watanabe. This patent discloses the use of a gage fixture into which the entire length of the cutting blade is placed so that it may be aligned along a single surface. The gage disclosed in this patent is used to adjust positioning members along the side surface of the blade, the blade is then transferred to the blade holder which has structures that interlock with the blade positioning members. One problem with this method, however, is that the junction between the blade positioning member and its interlocking element in the blade holder creates an additional tolerance which adds to the degree of possible misalignment between the cutting edge of the blade and the blade holder. Another problem is that the blade alignment elements of the gage are themselves adjustable screws. If the alignment screws are not adjusted properly, inaccuracy occurs. And finally, the Watanabe system requires a hand tool for setting the blade positioning means which abut alignment screws as they are set. The use of a separate hand tool introduces yet another possibility for operator error.

There is therefore a need in the art for a reliable, accurate and fast way to properly set the height of a cutting blade within its holder that simplifies the number of parts and provides a process which minimizes or eliminates operator error.

SUMMARY OF THE INVENTION

In order to meet the needs in the art described above, the present invention has been devised which utilizes a longitudinal gage fixture that extends the entire length of the cutting blade and which provides positively locked, parallel surfaces that uniformly and reliably set the proper height of the blade along its entire length while in the blade holder. This device requires no frictional movement of the gage along the length of the blade, and the setting of the blade may be achieved in an accurate, single step process. Most importantly, it adjusts the blade while it is in the blade holder without the need for removing the blade or intermediate adjusting elements.

According to the present invention, the entire blade and holder assembly is positioned within the gage fixture, therefore no intermediate positioning means between the blade and holder are needed. As further described herein the standard adjusting screws at the base of the holder are accessed through apertures in a baseplate of the gage fixture so that all necessary adjustments of the blade may be made with the holder insitu and without any movement of the holder. Only the movement of the blade within the holder is required during adjustment. Furthermore, once properly positioned, the tightening down of the blade may also be accomplished with the blade and holder still set within the gage fixture. Once the blade is properly set, the blade and holder, as the unit, may be removed from the fixture simply by retracting the spring-loaded top member, and then withdrawing the blade assembly out of the fixture.

More specifically, the Applicant has devised a blade height adjustment gage, comprising a gage fixture including a top member having an interior-facing blade contacting surface. Two, right and left side, spacer blocks and a baseplate are affixed to the fixture support plate. Each spacer block is of equal length so that when all parts are secured the base is parallel to the contact surface of the top member, the distance therebetween defining a predetermined gage height. Also, included are tool access means through the bottom of the baseplate whereby a tool may be inserted through the baseplate into the bottom portion of a blade holder. The blade holder is positioned within the fixture for moving the blade into contact with the contact surface area of the top member while the blade holder abuts an interior surface of the baseplate.

The method for blade adjustment according to the present invention comprises first removing the blade holder assembly from the cutter drum and loosening all the clamping and adjusting screws. The blade holder assembly is then placed into a gage fixture in which the top member is in its open position to receive the blade holder assembly. The top member is then moved to its closed position by screw drive means. The baseplate abuts the bottom surface of the blade holder and includes tool access means for inserting tool means through the baseplate to engage longitudinal adjusting screws on the blade holder which axially move the bottom of the blade at various points along its length. The blade is then moved by the adjusting screws until the cutting edge contacts an inside surface of a top member of the gage fixture. The blade holder clamp screws are then tightened. The gage fixture top member is then withdrawn and the blade holder assembly removed from the gage fixture. Finally, the blade holder is reinstalled into the cutter drum. This may be accomplished without any other structures frictionally moving across the cutting edge of the blade that might dull it.

These and other advantages of the present invention will be readily apparent to those of skill in the art from the following drawings and description of the preferred embodiment.

DESCRIPTION OF THE PREFERRED EMBODIMENT

Figures 1, 2:
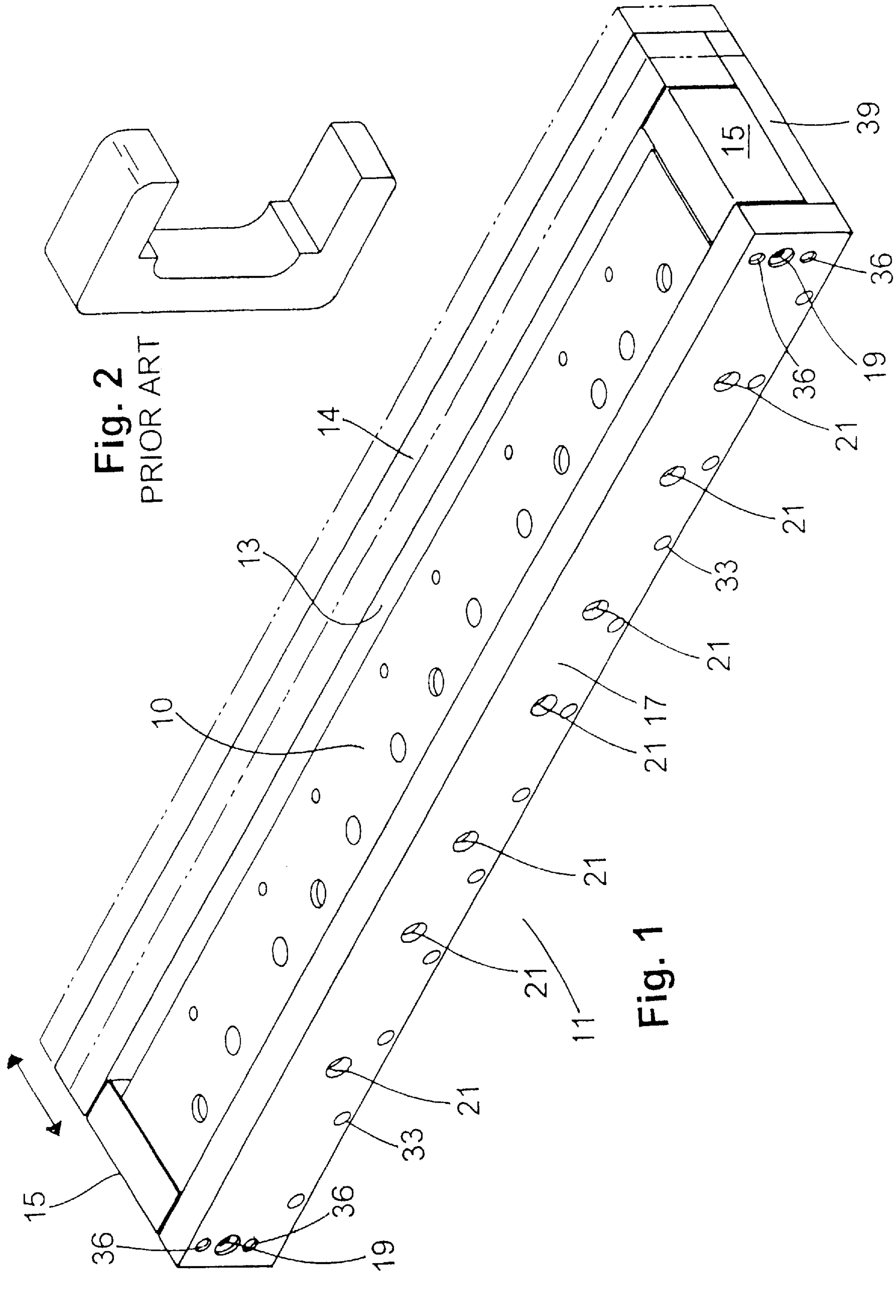
Fig. 2 PRIOR ART
FIG. 1 is an isometric view of the present invention showing the blade and blade holder set in the gage fixture.
FIG. 2 is an isometric view of a prior art blade height gage tool.

Referring to FIG. 1, the blade and blade holder assembly 10 is shown set into the gage fixture 11 of the present invention. The various parts of the gage fixture are fastened to support plate 39 against which the blade holder rests as the blade is being adjusted. The gage fixture includes a blade contact surface 13, side spacer blocks 15 and a baseplate 17. The baseplate is rigidly affixed to the fixture support plate 39 by attachment screws 38. The spacer blocks 15 are secured to the baseplate by screws 36. Side spacer blocks 15 are dimensioned to provide the desired setting distance between the base of the blade holder and the blade cutting edge. The side spacer blocks are carefully machined to equal lengths to ensure that the baseplate is parallel to the blade contact surface of the top member. Apertures 21 in the baseplate provide tool access for the blase height adjustment screws in the base of the blade holder. As will be further described herein, turning screws 19 moves top member 14 toward or away from blade holder 10. The closed position of the top member is shown is solid lines, the open position of the top member is shown in phantom.

Figure 3:
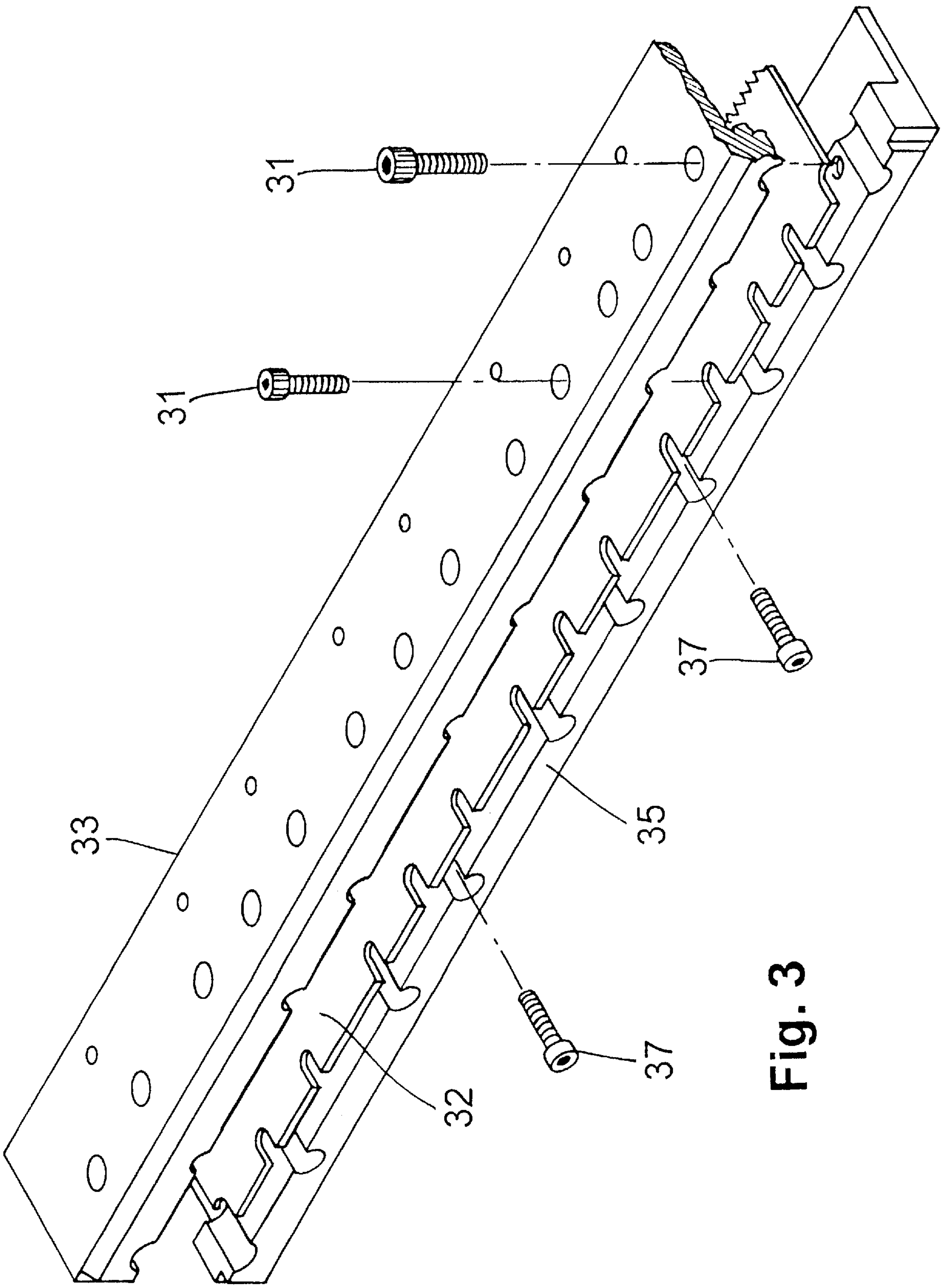
FIG. 3 is an isometric exploded view of the blade and the blade holder block.

Referring now to FIG. 3, greater detail of the blade and blade holder assembly is shown. Clamping screws 31 clamp the blade 32 between opposing side plates 33 and 35. Blade adjustment screws 37 make contact along the bottom edge of the blade and determine the distance that the blade projects from the end of the blade holder at different points along its length. When tightened down, clamp screws 31 hold blade 32 in position.

Figure 4:
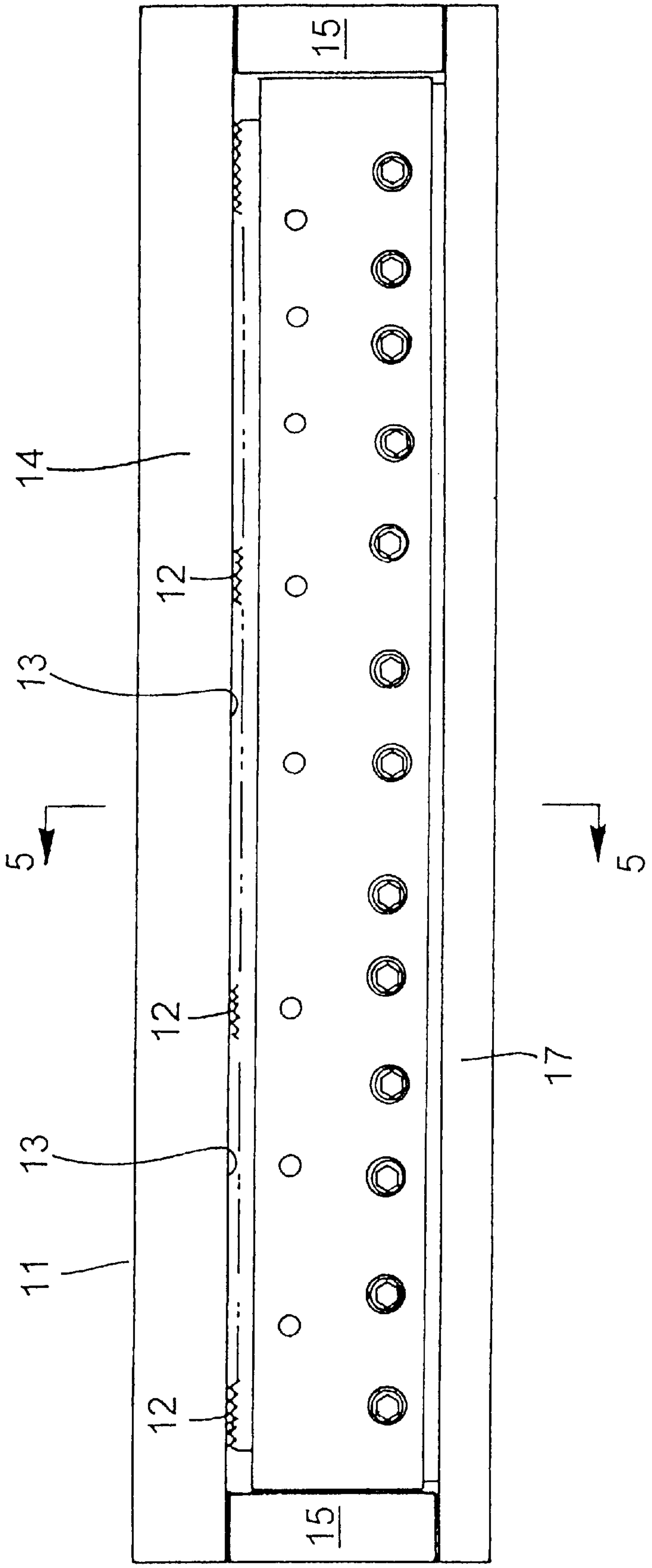
FIG. 4 is a top view of the blade assembly and the gage fixture as shown in FIG. 1.

Referring now to FIG. 4, the blade holder assembly is shown fitted within the gage fixture 11 of the present invention. In this FIG., the fixture is shown with the top member 14 in its closed position, abutting the ends of the spacer blocks. As shown in this FIG., the cutting edge 12 of the blade contacts the inside surface 13 of the top member 14 along the entire length of the blade, while the base of the blade holder is in contact with the baseplate 17. The parallelism between the baseplate and the top member ensures likewise parallelism between the blade cutting edge and the bottom of the blade holder when the blade is finally adjusted.

Figure 5:
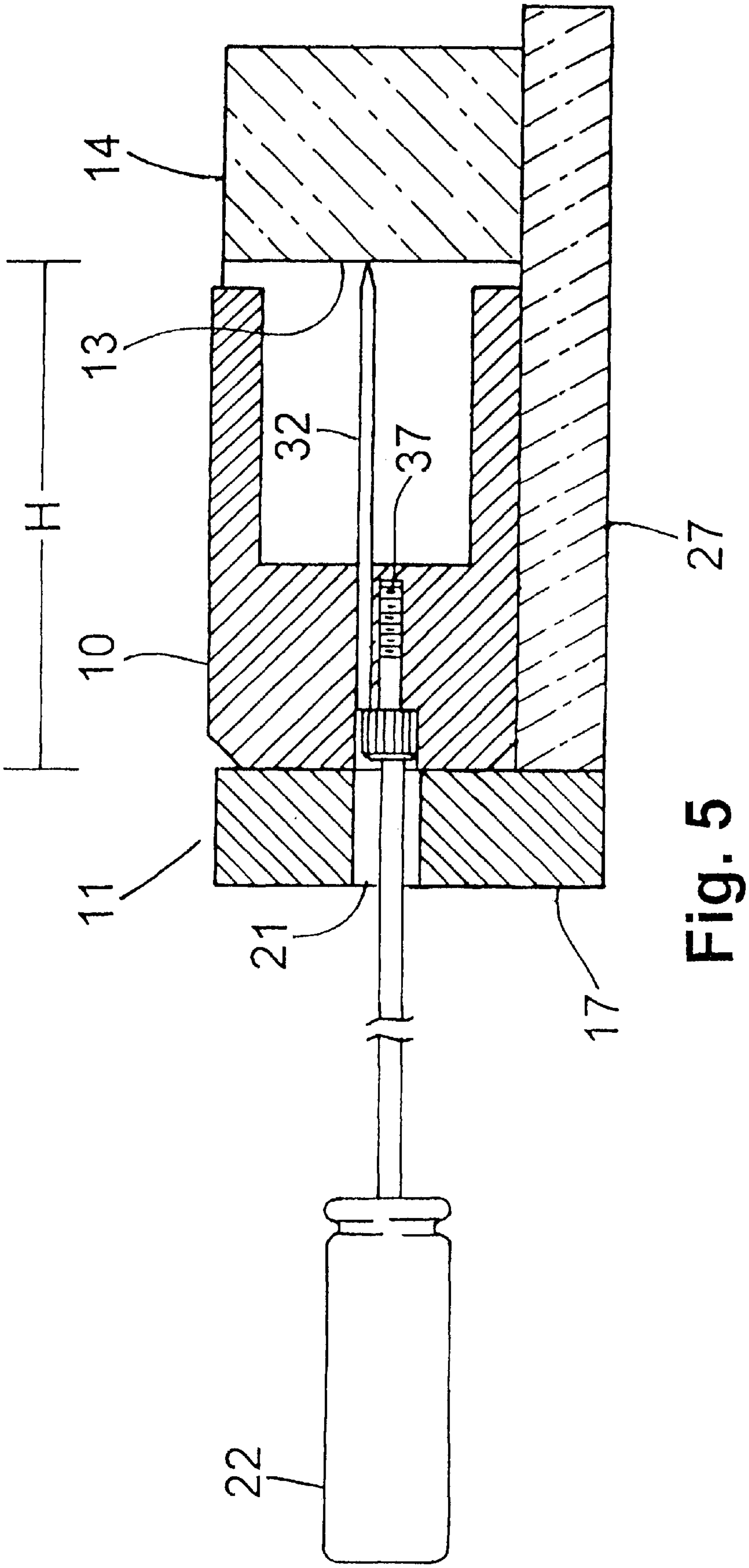
FIG. 5 is a cross-section view taken from FIG. 4 as shown in that figure.

Referring now to FIG. 5, this cross-sectional view taken from FIG. 4 shows the blade holder assembly 10 within the fixture gage 11 and the accessability of the blade holder adjustment screws 37 to the outside of the gage fixture through access apertures 21 in the baseplate 17. The use of the adjustment tool and the alignment of parts between the adjusting tool, the baseplate and the blade holder within the gage fixture is also clearly shown. Tool 22 is shown engaging the head of adjusting screw 37. As screw 37 is turned inward, the underside if the screw head contacts the base of blade 32 and advances it toward the contact surface 13. When contact is made, screw 37 resists turning. The operator of manual tool 22 can feel this resistence which indicates that the blade has reached the proper position. After adjustment, the cutting edge of the blade will be precisely parallel to the base of the blade holder assembly and its cutting edge will project the preselected distance "H" from the base of the blade holder. It will also be readily understood that this distance is also the length of the spacer blocks. Different blade heights may be achieved by exchanging different pairs of spacer blocks of different lengths.

Figure 6:
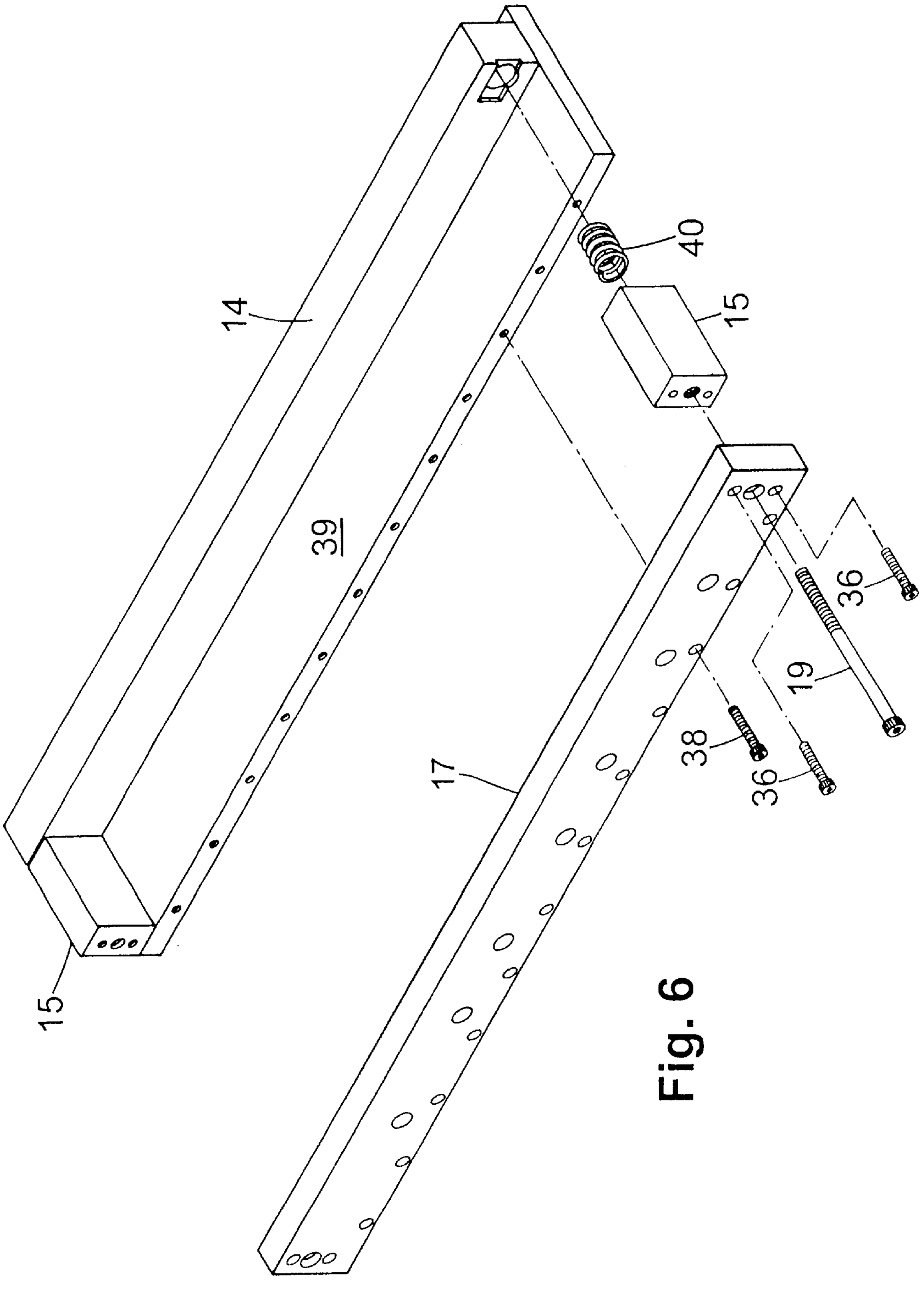
FIG. 6 is an isometric assembly view similar to FIG. 1 showing the gage fixture construction.

FIG. 6 shows greater detail of the particular construction of the preferred embodiment. Screws 19 extend through the entire length of the spacer blocks 15 and threadably engage the top member 14 so that due to the force of spring 40, the top member 14 moves toward or away from the baseplate as screw 19 is turned either clockwise or counter-clockwise. This allows the top member to be withdrawn and held away from the blade holder assembly as it is placed into and removed from the fixture. The gage fixture is preferably manufactured from metal, either steel or aluminum. The body of the fixture may be constructed from welded plates.

Figure 7:
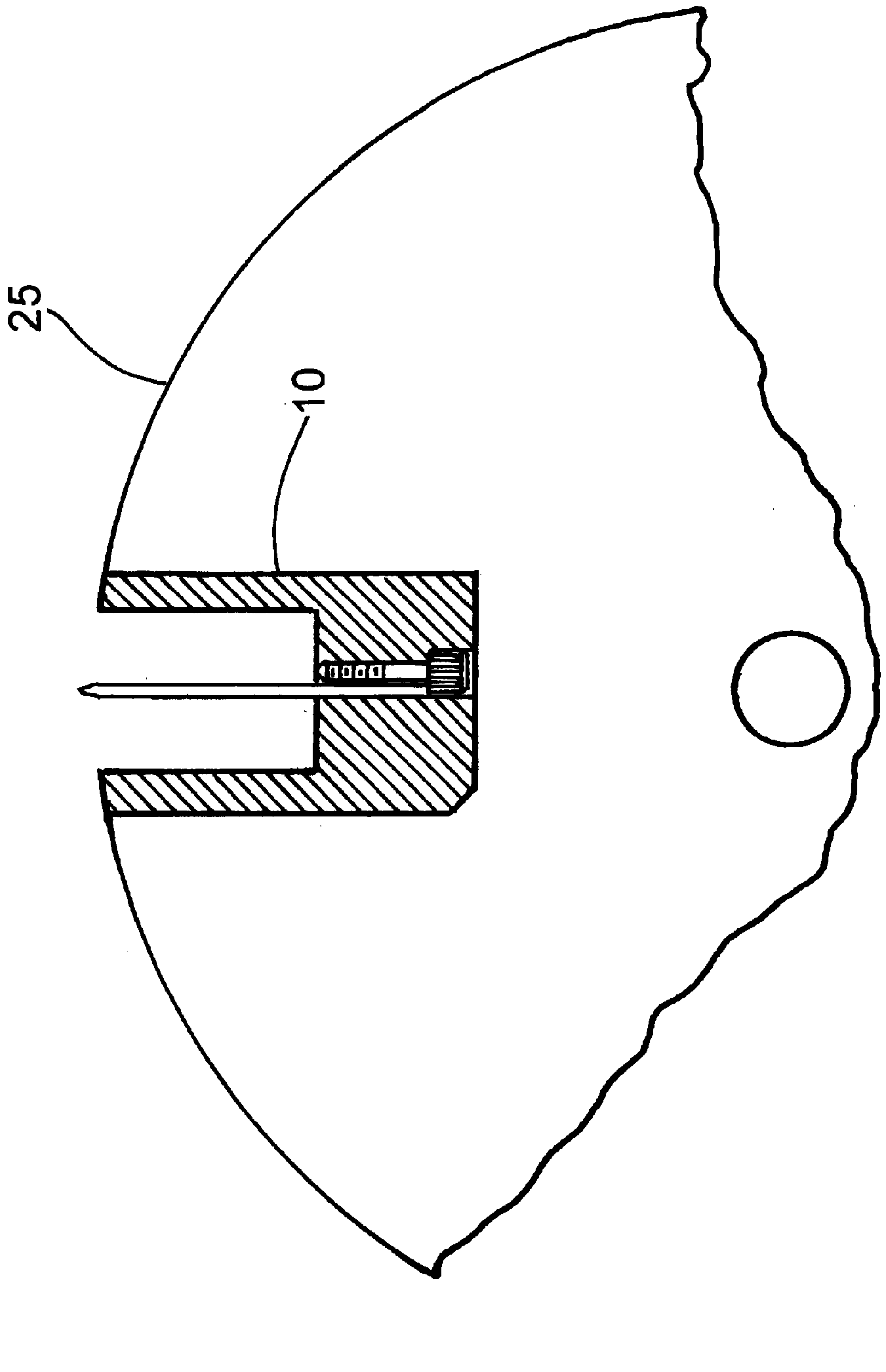
PRIOR ART Fig. 7
FIG. 7 is a partial side sectional view showing the blade holder assembly in a rotary cutter drum.

The blade height setting gage of the present invention is employed as follows. First, the blade assembly 10 is removed from the cutter drum 25 as shown in FIG. 7. The top member of the gage fixture is then withdrawn. The entire blade holder and blade assembly is then placed within the gage fixture with the blade holder clamp screws and adjusting screws all loosened. The top member of the gage fixture is then firmly screwed down against the side spacer blocks moving it to its closed position. A suitable tool, such as a screwdriver, is then inserted through apertures in the baseplate to access the blade holder adjusting screws which are turned in, pushing the blade into contact with the inside surface of the top member of the gage. This process is repeated down the length of the blade holder assembly. While the assembly is still in fixture, the blade clamp screws are then tightened down from above to hold the blade firmly in its adjusted position. The top member is then drawn away from the blade by the spring means as its drive screws are loosened. Then, the blade holder assembly is withdrawn from the gage fixture. The blade holder assembly is then reinstalled into the cutter drum and the process is complete. member of the gage. This process is repeated down the length of the blade holder assembly. While the assembly is still in fixture, the blade clamp screws are then tightened down from above to hold the blade firmly in its adjusted position. The top member is then drawn away from the blade by the spring means as its drive screws are loosened. Then, the blade holder assembly is withdrawn from the gage fixture. The blade holder assembly is then reinstalled into the cutter drum and the process is complete.

It will therefore be readily understood from the foregoing description that the objects of the present invention have been met. It should be understood, however, there may be many modifications, adaptations, and changes that may be made without departing from the invention disclosed herein, which should be determined only by the following claims and their legal equivalents.

What is claimed is:

1. A blade height adjustment gage in combination with a rotary cutter blade holder assembly, the blade height adjustment gage comprising:

a gage fixture having means for receiving a rotary cutter blade holder assembly and including a support plate, a top member mounted with respect to said support plate, said top member having an interior-facing, blade-contacting surface, a baseplate rigidly affixed to said support plate, said baseplate being parallel to said contact surface of said top member and the distance therebetween defining a gage height, right and left side opposing side spacer blocks affixed to said baseplate, and tool access means through the bottom of said baseplate whereby a tool is inserted through said baseplate into the bottom portion of a blade holder for moving said blade into contact with said contact surface of said top member while said bottom portion of said blade holder assembly abuts an interior surface of said baseplate.

2. The method of adjusting the height of a rotary cutter blade affixed within a blade holder assembly secured to a cutter drum, comprising:

removing said blade holder assembly from said cutter drum;

loosening all clamping and adjusting screws on said blade holder;

placing said blade holder assembly into a gage fixture having a baseplate, said baseplate having an interior surface abutting said blade holder assembly, said baseplate further including tool access means;

drawing down a movable top member against side spacer blocks by turning screws which extend through the spacer blocks and threadably engage said top member, said top member including a blade contacting interior surface;

inserting tool means through access means in said baseplate and engaging longitudinal adjusting screws on said blade holder which axially contact the bottom of the blade at various points along its length;

turning said adjusting screws against said blade, moving said blade until a cutting edge of said blade contacts an inside surface of said top member of said gage fixture;

tightening said blade holder clamp screws;

withdrawing said top member away from said blade;

removing said blade holder assembly from said gage fixture; and reinstalling said blade holder assembly into said cutter drum.

3. The blade height adjustment gage of claim 1 further including compression springs and screw means operative between said top member and said spacer blocks, whereby said top plate is resiliently biased away from said baseplate by said springs and movable between open and closed positions by said screw means.

* * * * *